(12) United States Patent
Kimura et al.

(10) Patent No.: US 7,529,885 B2
(45) Date of Patent: May 5, 2009

(54) CACHE CONTROL METHOD FOR NODE APPARATUS

(75) Inventors: Shinji Kimura, Sagamihara (JP); Satoshi Oshima, Tachikawa (JP); Hisashi Hashimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 342 days.

(21) Appl. No.: 10/663,700

(22) Filed: Sep. 17, 2003

(65) Prior Publication Data

US 2004/0186961 A1  Sep. 23, 2004

(30) Foreign Application Priority Data

Mar. 19, 2003  (JP) .............................. 2003-075181

(51) Int. Cl.
*G06F 13/16* (2006.01)

(52) U.S. Cl. ..................................................... 711/113

(58) Field of Classification Search ........................ None
See application file for complete search history.

(56) References Cited

U.S. PATENT DOCUMENTS

| | | | |
|---|---|---|---|
| 5,423,019 A | 6/1995 | Lin | |
| 5,452,447 A | 9/1995 | Nelson et al. | |
| 5,732,241 A * | 3/1998 | Chan | 711/131 |
| 5,737,522 A * | 4/1998 | Matsumoto | 714/49 |
| 5,860,107 A | 1/1999 | Patel | |
| 5,982,887 A * | 11/1999 | Hirotani | 705/51 |
| 6,032,225 A * | 2/2000 | Shiell et al. | 711/117 |
| 6,799,244 B2 | 9/2004 | Tanaka et al. | |
| 7,139,890 B2 * | 11/2006 | Moran et al. | 711/163 |
| 2002/0144119 A1* | 10/2002 | Benantar | 713/171 |
| 2003/0009640 A1 | 1/2003 | Arimilli et al. | |
| 2003/0074525 A1 | 4/2003 | Yamauchi et al. | |
| 2003/0163647 A1* | 8/2003 | Cameron et al. | 711/138 |
| 2003/0188085 A1 | 10/2003 | Arakawa et al. | |
| 2004/0034746 A1 | 2/2004 | Horn et al. | |

(Continued)

FOREIGN PATENT DOCUMENTS

EP  0 509 676 B1  10/1992

(Continued)

OTHER PUBLICATIONS

Cisco Systems, et al., Internetworking Technologies Handbook, chapter 53 "Networking Caching Technologies", © Dec. 2000.

*Primary Examiner*—Hyung S Sough
*Assistant Examiner*—Shawn Eland
(74) *Attorney, Agent, or Firm*—Brundidge & Stanger, P.C.

(57) ABSTRACT

The present invention provides a technique of controlling cache operation on a node device in a computer system that enables transmission and receipt of data between clients and a storage device via the node device. In accordance with a first control method, the data stored in the storage device includes attribute data, as to whether or not the data is cacheable. This application enables the node device to relay non-cacheable data without process of the cache. In accordance with a second control method, the node device encrypts the data when caching the data in the disk. In accordance with a third control method, non-cacheable data is transmitted and received directly without going through the node device. These applications enable the cache in the node device to be restricted, and thereby ensure security.

16 Claims, 14 Drawing Sheets

U.S. PATENT DOCUMENTS

| | | |
|---|---|---|
| 2004/0123049 A1 | 6/2004 | Cypher et al. |
| 2004/0123068 A1 | 6/2004 | Hashimoto |
| 2004/0186898 A1 | 9/2004 | Kimura et al. |
| 2004/0186961 A1 | 9/2004 | Kimura et al. |

FOREIGN PATENT DOCUMENTS

| | | |
|---|---|---|
| EP | 0 886 216 A1 | 12/1998 |
| JP | 6-332716 | 12/1994 |
| JP | 2000-112860 A | 4/2000 |
| JP | 2000-259583 | 9/2000 |
| JP | 2001-75853 | 3/2001 |

* cited by examiner

Fig.3

| User ID | Password | Virtual Volume | Attribute | IP Address |
|---|---|---|---|---|
| User A | ***** | VDa | Personal | IPa |
| User B | ***** | VDb | Personal | |
| User C | ***** | VDc | Shared | |

334 (IP Address column)

*Fig.5*

| Virtual Block | | Cache Block | | Write in Disk |
|---|---|---|---|---|
| Virtual Volume | Block | Storage location | Block | |
| VDa | BL0 | Disk | BL0 | OK |
| VDb | BL0 | Memory | BL1 | OK |
| VDa | BL1 | Memory | BL0 | NG |
| VDb | BL2 | Disk | BL3 | OK |

232

CACHE CONTROL METHOD FOR NODE APPARATUS

BACKGROUND OF THE INVENTION

1. Field of the Invention

The present invention relates to a technique of cache control in a node device, which relays data between a storage device and clients.

2. Description of the Related Art

A large scale computing system connecting with a plurality of client computers (Hereinafter referred to as a "client") via a network is typically constructed in companies. Such a computer system requires a mass memory device, what is called a storage device, to provide a variety of data and programs used for operations on respective clients. The storage device with a high capacity hard disk enables users of clients to store and read out data and programs in the allocated area for themselves or in the shared area. One typical protocol to access to the storage device is SCSI (Small Computer System Interface). Recently, another protocol called iSCSI has been applied to divide a SCSI command into IP packets to be transmitted via a network. The use of iSCSI attempts to provide an environment where a greater number of clients or clients located in a remote place can access to the storage device.

One typical method for utilizing the storage device is a remote boot, that is, a start-up of the client. In case of the remote boot, an operating system required to the start-up and a variety of files, such as a configuration file are pre-stored in an area corresponding to the individual user on the storage device. Each client is capable of start-up with reading of these files from the storage device via the network.

When executing the remote boot, each client is not required to incorporate a hard disk but it is sufficient to include a ROM for storing relatively smaller boot program to achieve the access to the storage device. Unifying the management of the data on the storage device, instead of storing the data in the hard disk of each client, prevents important data from being lost or leaked even if the client is damaged or stolen, and thereby enhances the security. This application also has practical advantage that allows users to start up any client connected on the network with a certain setup proper to the user. The details of the remote boot has been disclosed in, for example, JP1994-332716A, JP2001-75853A and JP2000-259583A.

One available application includes a node device, equipped with a cache memory, between clients and the storage device to reduce accesses to the storage device. In this system, the cached data in the node device may be supplied to clients without accessing to the storage device, and thus reduces the number of accesses to the storage device.

One problem with a system including a node device is that security on the node device inclines to fragile. Storage devices are generally managed with highly strict security as secret data of a company centers thereon. For example, it is strictly limited to enter the room where the storage device is located along with the access to the storage device in the software system using a fire wall or the like. Also, applying a diskless computer, that is, a computer without a hard disk, to the client prevents the leakage of the data. Even if the client is equipped with the hard disk, it is assumed that the user be concerned about his own device to avoid theft or unauthorized use, and thus ensures a certain level of security. The security level of the node device, on the other hand, is not as high as that of the storage device, and users are less concerned about the security. The secret data, transmitted and received between the storage device and the client, is cached in the node device under such an environment. The node device is in danger of the theft or the unauthorized access, which can cause the leakage of the data. One typical example of such secret data is a core dump, which is output from the client when troubles occur in an operation. The core dump is written in the internal hard disk on an ordinary computer while being written in the storage device on a diskless computer after process of cache in the node device. The core dump includes various secret information, which has been stored in the computer, such as a password to access to the storage device, and thus the leakage of the core dump causes the unauthorized access to the storage device to be permitted. The object of the present invention is thus to provide a technique that enhances security of the node device.

SUMMARY OF THE INVENTION

The present invention is directed to a cache control method in a computer system, in which a storage device, a node device including a disk device and clients are connected together, that controls the cache in the disk device. This method may be applied only to process of the cache in the disk device or may additionally be applied to the cache in a volatile memory in the node device.

[A First Control Method]

A first control method is attained by using attribute information that indicates as to whether or not the data is allowed to be cached in the disk device. Either the storage device or the client outputs the above attribute information regarding the data to be relayed via the node device. The node device relays the data that has been judged as non-cacheable, based on the attribute information without the process of the cache in the disk device. This application prevents secret data from being cached in the node device, and ensures security.

If the node device has a volatile memory for the cache in addition to the disk device, the data that has been judged as non-cacheable may be restricted to be cached both in the volatile memory and the disk device. Another available application enables the cache in the volatile memory regardless of the data attribute, cacheable or non-cacheable, and permits writing of the data except for non-cacheable data in the disk device from the volatile memory.

A variety of schedules are available to acquire the attribute information that determines as to whether or not the data is cacheable. For example, the attribute information may be input in association with the data during the relay of the data. The data and the attribute information may integrally be input which the attribute information is included in the header or the like therein, or only attribute information may be input in distinction from the data to be relayed.

This application is attained by managing the attribute information about each data on the storage device in advance and by providing the node device with a function of notifying the attribute information.

In the case where the storage device manages the attribute information in association with storage block of the data, the node device may previously acquire and manage the association. This application enables the judgment as to whether or not the data is cacheable, without acquiring the attribute information from the storage device during the relay of the data.

The attribute information does not need to be notification about each data regarding whether or not the data is cacheable. One available example of the attribute information includes notification of occurrence of a software error in the client. After receipt of this notification, the node device may switch a cache operation of the data from the client, from cacheable to non-cacheable. In one example, the data from the client that issues the notification is to be regarded as non-cacheable. Another available example of the attribute information includes notification of recovery in normal of the operation on the client. The attribute information may thus include notification of the timing for switching the cache operation in the node device, between cacheable and non-cacheable.

This notification may be attained by causing the client to function to output the attribute information to the node device when the predetermined condition for requesting the node device to restrict the cache operation is met. The client preferably transmits the data to the node device with or after output of the attribute information. A variety of conditions, for example, those on the basis of errors as described or start-up of specific application that is preset, are available for requesting the restriction of the cache operation.

[Second Control Method]

In accordance with a second control method, the data is cached by process of encryption in the node device and writing the encrypted data in the disk device. Upon receipt of a read out command of the cached data, the node device decodes the data read out from the disk device and transmits the decoded data to the storage device or the client. The encryption may be executed at various timings prior to the writing of the data in the disk device, for example, just before writing the data or at the time of receiving the data. This arrangement ensures security of the data in case of theft of the disk device.

In accordance with the second control method, it is not necessary to encrypt all of the data. One available example of the encryption uses the attribute information of the data to be relayed, which indicates as to whether or not the data is required to be encrypted, and thus switches encryption operation, based on this attribute information. The specification of the attribute information may include various information, as exemplified in the first control method, for determining whether of not the data is cacheable. This application avoids unnecessary process of the encryption, and thus reduces load on the operation in the node device. One available example of the attribute information may include notification of the timing to switch the encryption operation as to whether or not the data is required to be encrypted, in a similar manner as the first control method.

In accordance with the second control method, key data, which is used to encrypt or decode the data, is preferably managed in the volatile memory. Because the key data is erased, this application prevents the data stored in the disk device from being decoded in case of thief of the node device. The node device may obtain the key data from the storage device, or may generate therein. In the case that the storage device issues the key data, the storage device preferably manages the key data to avoid the issue of duplicate key data among node devices. This application prevents the issued key data from being applied to other node devices, and thus ensures the security even if a counterfeit node device acquires the key data. A variety of conditions are settable in order to issue the key data from the storage device to the node device, such as a timing of start-up of the node device or in response to the request to issue the key data, from the administrator of the node device to the storage device.

[Third Control Method]

The third control method is attained where the destination of the data is switched by a data source device that transmits the data, during process of data transmission between the storage device and the client. The data source device determines as to whether or not the data to be provided is allowed to be cached in the disk device. The condition for judging as to whether or not the data is cacheable may be preset for each data, or may be set in connection with a specific event, such as a "software error", or certain timing. The data source device transmits the data that has been judged as cacheable to the node device, and the node device caches the received data in the disk device. The data judged as non-cacheable is directly transmitted to a receiving device without going through the node device. This application prevents the data from being cached with no specific control required in the node device.

To attain the third control method, the data source device may manage address information of the receiving computer in addition to that of the node device. In the case that the data has been judged as non-cacheable, the data source device may switch the destination address of the data, from the node device to the address information that is previously managed, and thus enables a communication without going through the node device. This arrangement is effectively used where the address information of the receiving computer has been preset, for example, at the transmission of the data, from the client to the storage device.

In another available arrangement, the node device transmits the information, such as address information, a client name and client identification information, to identify the client, which has issued the read out command, in response to the receipt of the read out command of the data in the storage device. This enables the storage device to specify the destination of the data in case of detouring around the node device. The storage device may notify the completion of the transmission of the data when transmitting the data to the client without going through the node device. Applying the notification may be a reply to the read out command that has been sent from the node device to the storage device, and thus enables the node device to be released from wait mode.

The technique of the present invention is not restricted to the applications of the node device, the storage device and the client discussed above, but may be actualized by a diversity of other applications, such as a computer system to which these devices are connected and a control method that controls the cache operation in the node device. The technique of the present invention is also attained by the computer program or the recording medium in which such a computer program is recorded.

Typical examples of the recording medium include flexible disks, CD-ROMs, DVDs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BRIEF DESCRIPTION OF THE DRAWINGS

FIG. 3 schematically illustrates the structure of a user management table 334;

FIG. 5 schematically illustrates the structure of a cache management table 232;

DESCRIPTION OF THE PREFERRED EMBODIMENTS

Some modes of carrying out the invention are discussed below as embodiments in the following order:
A. First Embodiment
A1. Construction of System
A2. Functional Blocks
A3. Data structure of Table
A4. Process of Reading of Data
A5. Process of Writing of Data
A6. Modifications
B. Second Embodiment
B1. Functional Blocks
B2. Process of Reading of Data
B3. Process of Writing of Data
C. Third Embodiment
C1. Functional Blocks
C2. Process of Reading of Data
C3. Process of Writing of Data

A. First Embodiment

A1. Construction of System

Figure 1:
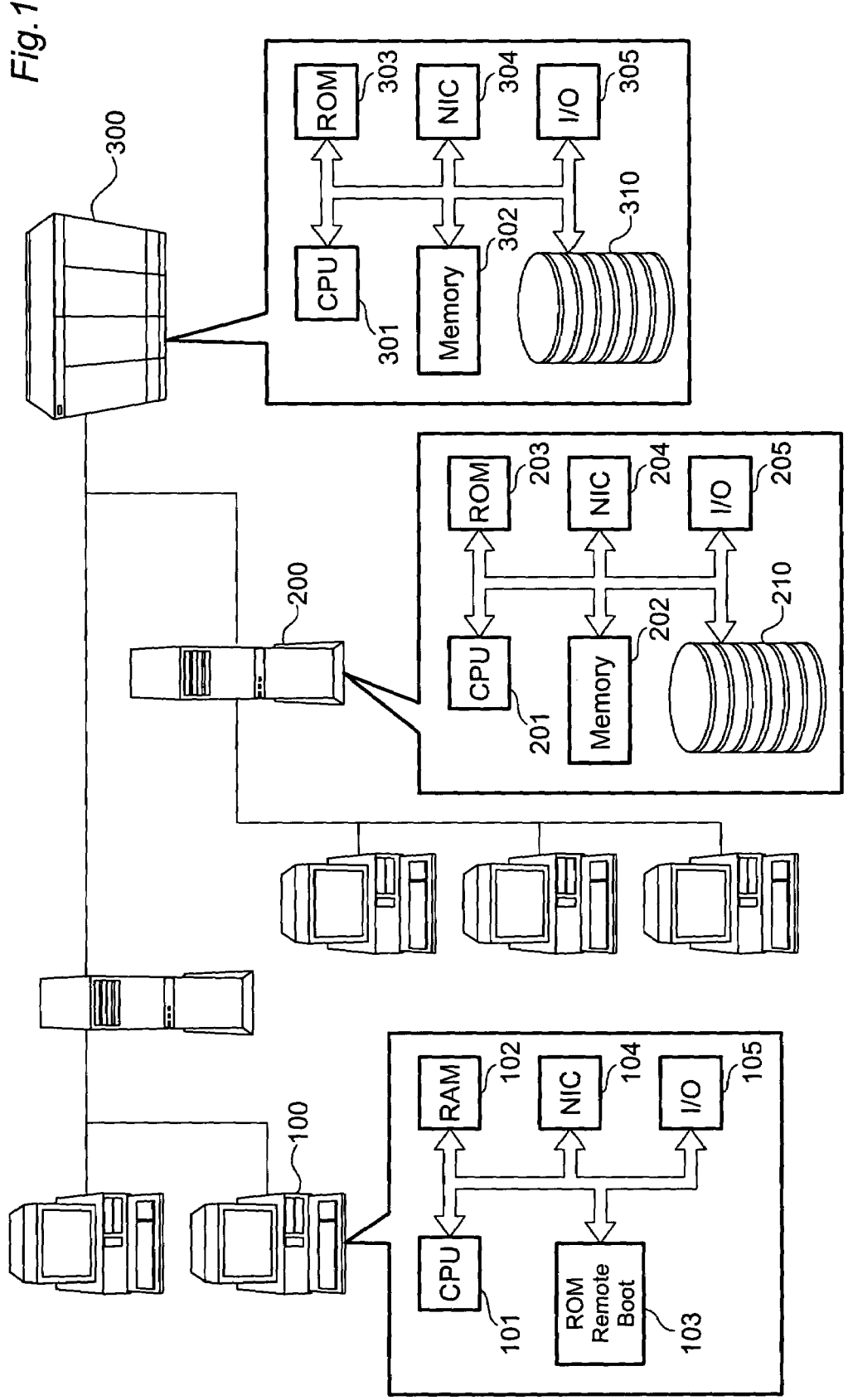
FIG. 1 schematically illustrates the construction of a computer system in accordance with a first embodiment.

FIG. 1 schematically illustrates the construction of a computer system in accordance with a first embodiment. In this computer system, a storage device 300 is connected with a plurality of node devices 200 and computers 100 via a network where IP packets can be transmitted and received. Applicable examples of the network include a LAN (Local Area Network), an intranet and the internet.

The storage device 300 is integrated in the system as a computer with a hardware structure as illustrated, which is capable of supply of the data, stored in a hard disk device 310, for respective computers 100 via the node device 200. Each computer 100 is also capable of storing the data in the hard disk device 310. A NIC (Network Interface Card) 304 is an interface to send and receive the data via the network. An I/O 305 is an interface for input and output devices.

A CPU 301 in the storage device 300 controls the transmission and the receipt of the data according to a control program, which is stored in the disk device 310 and a ROM 303. A memory 302 is a main memory, which is used while this program is running.

The node device 200 is integrated in the system as a computer with a hardware structure as illustrated and functions to relay the data between the storage device 300 and the computer 100. The disk device 210 and the memory 202 are used for the cache operation, that is, temporally storing of the data to be relayed. A NIC (Network Interface Card) 204 is an interface to send and receive the data via the network. An I/O 205 is an interface for input and output devices.

In the node device 200, the CPU 201 performs relay control and cache control of the data, according to a control program, which is stored in the disk device 210 and a ROM 203. The memory 202 is used while this program is running as well as during the cache operation. In accordance with this embodiment, the cache operation is switched depending on the attribute of the data to be relayed, cacheable or non-cacheable. The node device 200 relays the data that is restricted to be cached, without process of the cache. Two applications are available to restrict the cache operation. In accordance with the first embodiment, the node device 200 is restricted to cache all non-cacheable data. In accordance with the second embodiment, the node device 200 caches the data in the volatile memory 202 regardless of data attribute, cacheable or non-cacheable, and judges as to whether or not the data is cacheable when the data is migrated from the memory 202 to the disk device 210. The former method for controlling the cache operation as to whether or not the data is cacheable will be discussed in the first embodiment herein and the latter method will be discussed in the second embodiment as a modification.

The computer 100 is a diskless computer without a hard disk, which incorporates a CPU 101, a RAM 102, a ROM 103, a NIC 104 and an I/O 105. The computer 100 executes a remote boot with reading of files required for start-up, such as an operating system, from the storage device 300. The ROM 103 pre-stores a remote boot program.

The program for controlling operations on the storage device 300, the node device 200 and the computer 100 may be provided for the storage device by means of a storage media, such as a CD-ROM.

A2. Functional Blocks

Figure 2:
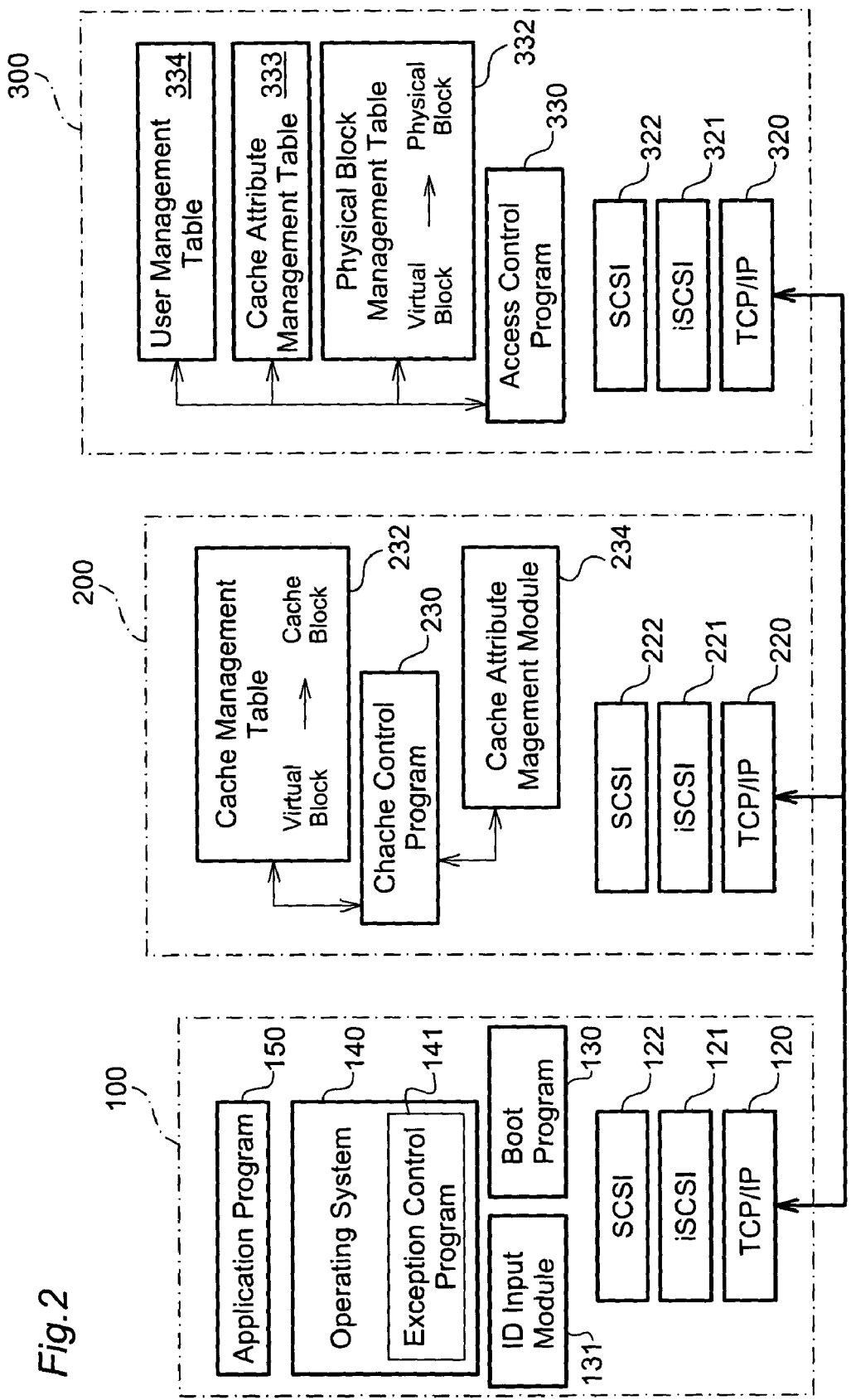
FIG. 2 shows functional blocks of respective devices in a computer system.

FIG. 2 shows functional blocks of respective devices in the computer system. In this embodiment, the respective functional blocks as illustrated are actualized by the software configuration with an installation of a computer program. The respective functional blocks may also be actualized by the hardware structure.

Functional blocks of the computer system 100 will be explained as below. A TCP/IP module 120 transmits IP packets via the network. A SCSI module 122 transmits and receives a read out command and a write command to and from the storage device 300. An ISCSI module 121 executes conversion between a SCSI command and IP packets, and thus enables the SCSI command to be transmitted and received via TCP/IP. A boot program 130 executes the remote boot in the computer 100. The boot program 130 functions to initialize the computer 100, to read files required to the start-up, such as the operating system, from the storage device and to boot these files. An ID input module 131 inputs an user ID and a password, and transmits those information to the storage device 300 at the remote boot. In accordance with this embodiment, these modules carry out respective functions with the program stored in the ROM 103.

Upon completion of the remote boot with respective functional blocks as discussed above, the operating system 140 in the computer 100 is started up in response to receipt of the file, which is transmitted from the storage device 300. The operating system 140 includes an exception control program 141 that functions to record various information in the storage device 300 as a core dump in case of occurrence of an error in the computer 100. An application 150 to be used in respective process on the computer 100 is provided by the storage device 300 and runs on the operating system 140.

In accordance with this embodiment, a virtual volume is provided for each client. Virtual volume does not indicate physical area set in the disk device 310 in the storage device 300 but means a logical disk to manage the data of each client. Each virtual volume is set in association with the corresponding user ID. Input of the User ID on the computer 100 enables the association between the virtual volume and the computer 100. Hereinafter, the term "client" does not merely represent a computer with the hardware structure but includes the status in association with the virtual volume where the user logs in.

The node device 200 includes a TCP/IP module 220, an iSCSI module 221 and a SCSI module 222 so that the SCSI command can be transmitted and received via the network. The application running on the predetermined operating system, which is installed in the node device 200, achieves a cache control program 230.

The cache control program 230 controls the cache operation in the node device 200, with reference to a cache attribute management module 234 and a cache management table 232. The cache management table 232 is provided for mapping the virtual block, which is selected by the client, with the cache block, that is, data storage location in the node device 200. The cache attribute management module 234 manages a table that is provided for managing attribute information indicating as to whether or not the data is cacheable, regarding the data in respective virtual blocks. The data structure of these tables will be discussed later.

The storage device 300 includes a TCP/IP module 320, an iSCSI module 321 and a SCSI module 322 so that the SCSI command can be transmitted and received via the network. The application running on the predetermined operating system, which is installed in the storage device 300, achieves an access control program 330.

The access control program 330 controls reading and writing of the data in the disk device 310, with reference to a user management table 334 and a physical block management table 332. The user management table 334 is provided for associating the user ID with the virtual volume. The physical block management table 332 is provided for mapping the virtual block with the physical block. The access control program 330 acquires the user ID from the computer 100 at the start-up of the computer 100. The virtual volume corresponding to the user is allocated to the computer 100, with reference to the user management table 334, based on the user ID. The access control program 330 is subsequently allowed to control the reading and the writing of the data in the virtual block in the disk device 310, which is specified by the client, with reference to the physical block management table 332.

A cache management table 333 is provided for recording the information as to whether or not the data is cacheable, regarding respective virtual blocks. The access control program 330 controls the cache operation in the node device, cacheable or non-cacheable, with notification to the node device 200, based on the cache attribute management table 333.

A3. Data Structure of Table

FIG. 3 schematically illustrates the structure of the user management table 334. The user management table 334 manages the user ID, the password, the virtual volume, the attribute and the IP address, being associated one another. The attribute indicates as to whether or not any other user is accessible to the virtual volume. The term "private" means the status where no other users are permitted access while "shared" means that other users are permitted access. The IP address is varied depending on the computer where the user logs in. The attribute and the IP address may be optical items on the user management table 334.

Figure 4:
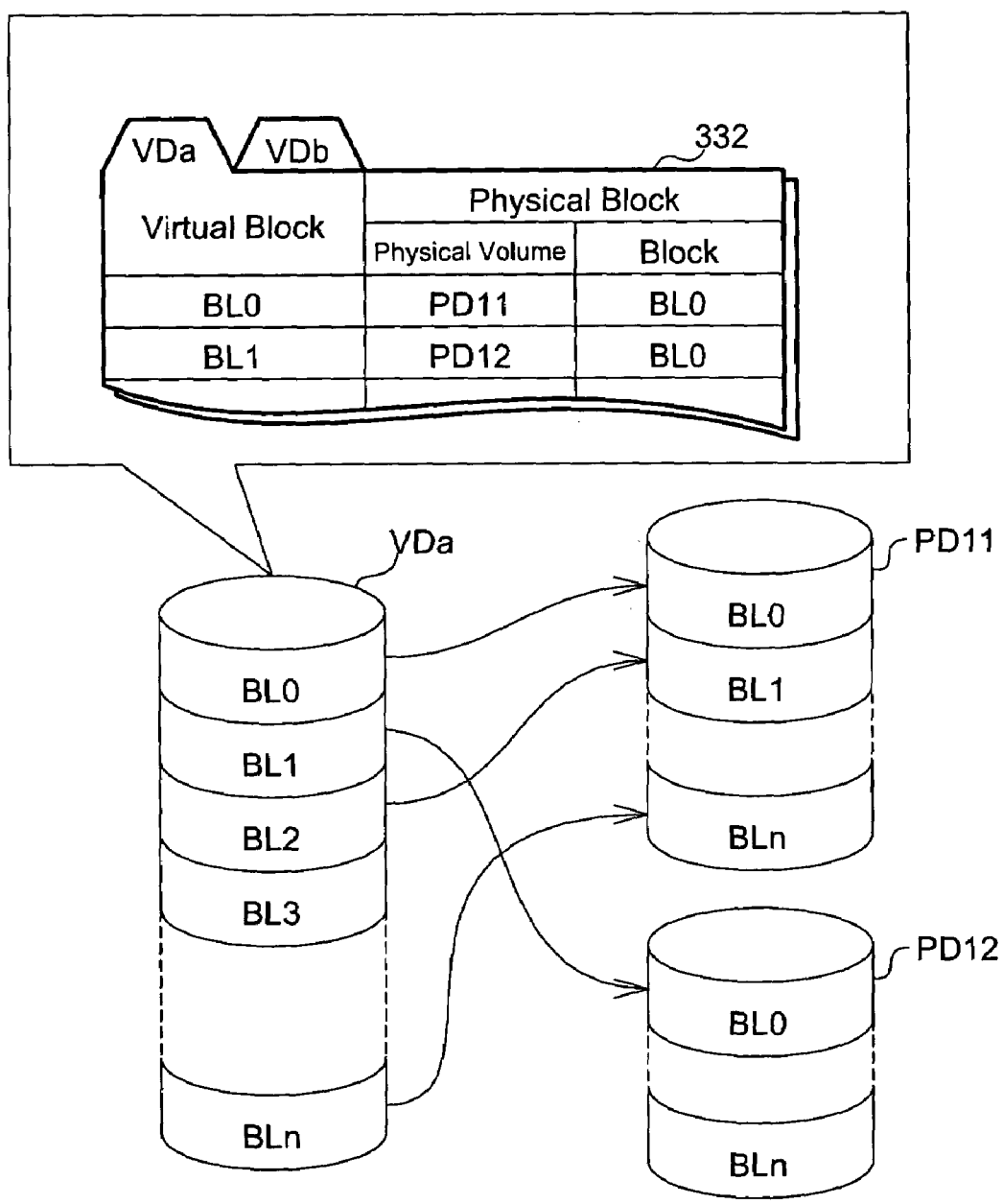
FIG. 4 schematically illustrates the structure of a physical block management table 332.

FIG. 4 schematically illustrates the structure of the physical block management table 332. The upper portion of FIG. 4 shows the data structure, and the lower portion shows exemplary mapping between the virtual block and the physical block, respectively. The physical block management table 332, which indicates the mapping between the virtual block and the physical block, is provided for each virtual volume. As shown in FIG. 4, the table is associated with the virtual volume VDa. This table stores physical blocks in which the actual data is stored relating to virtual blocks BL0-BLn in the virtual volume VDa. The physical block is defined by combination between the physical volume and the block number.

The exemplified table corresponds to the exemplary association shown lower portion of the figure. The data in the virtual block BL0 is stored in the block BL0 on the physical volume PD11. Similarly, respective data in virtual blocks BL1-BLn are stored in the physical volume, PD11 or PD12. An example in the figure shows that the disk device 310 is divided into a plurality of physical volumes with partitions. It is not, however, restricted but the disk device 310 may also be configured as a single physical volume. In this arrangement, the data regarding the physical volume may be omitted from the physical block management table 332.

FIG. 5 schematically illustrates the structure of the cache management table 232. This table provides the mapping between the virtual block and the cache block in the node device 200. The details of writing in the disk will be discussed later. The cached data is stored in the volatile memory 202 or the disk device 210 in the node device 200. The storage location and the block number are accordingly used to specify the cache block in accordance with this embodiment.

Figure 6:
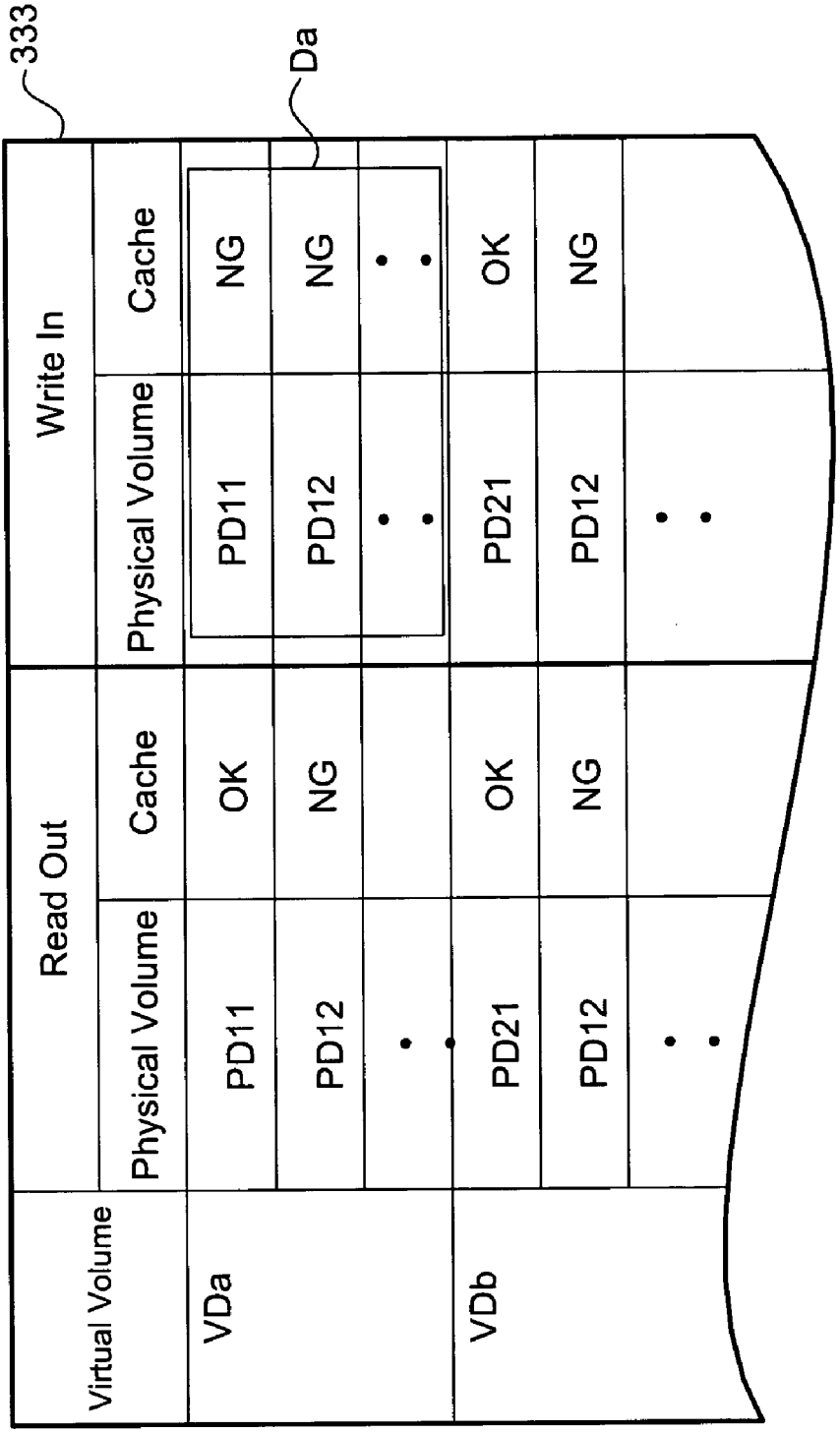
FIG. 6 schematically illustrates the structure of a cache attribute management table 333.

FIG. 6 schematically illustrates the structure of the cache attribute management table 333. The cache attribute management table 333 is provided for the reading and the writing of the data separately and stores the information indicating as to whether or not the data is cacheable for each virtual volume. Applying the disk device, which is divided into the plurality of physical volumes, enables setting of the cache operation, cacheable or non-cacheable, for each physical volume. For example, an example in the figure shows that the data stored in the physical volume PD11 is cacheable while the data in the physical volume PD12 is non-cacheable when reading the data in the virtual volume VDa.

In this figure, the physical volume PD12 is shared by virtual volumes VDa and VDb. Sharing the physical volume among a plurality of virtual volumes may thus be applied in this embodiment. In this case, the data stored in a share physical volume is shared among a plurality of clients corresponding to respective virtual volumes. An example in the figure shows that the cache attribute of a share physical volume PD12 is defined to non-cacheable. In an alternative application, the cache attribute of the share physical volume PD12 for VDa and VDb may be different. This alternative application enables the cache operation to be switched depending on the client. In one applicable example, the cache operation is allowed at the reading of the data from the virtual volume VDa while the cache operation is restricted at the reading from the virtual volume VDb.

The cache operation is managed in a same manner when storing the data. The setting of the cache status, cacheable or non-cacheable, may be dynamically changed at start-up of a computer system. For example, the node device 200 may temporally set the attribute "non-cacheable" to all physical volumes corresponding to the virtual volume VDa, upon detection of an operation error in the client that uses the virtual volume VDa (Refer to data area Da in the figure).

A4. Process of Reading of Data

Figure 7:
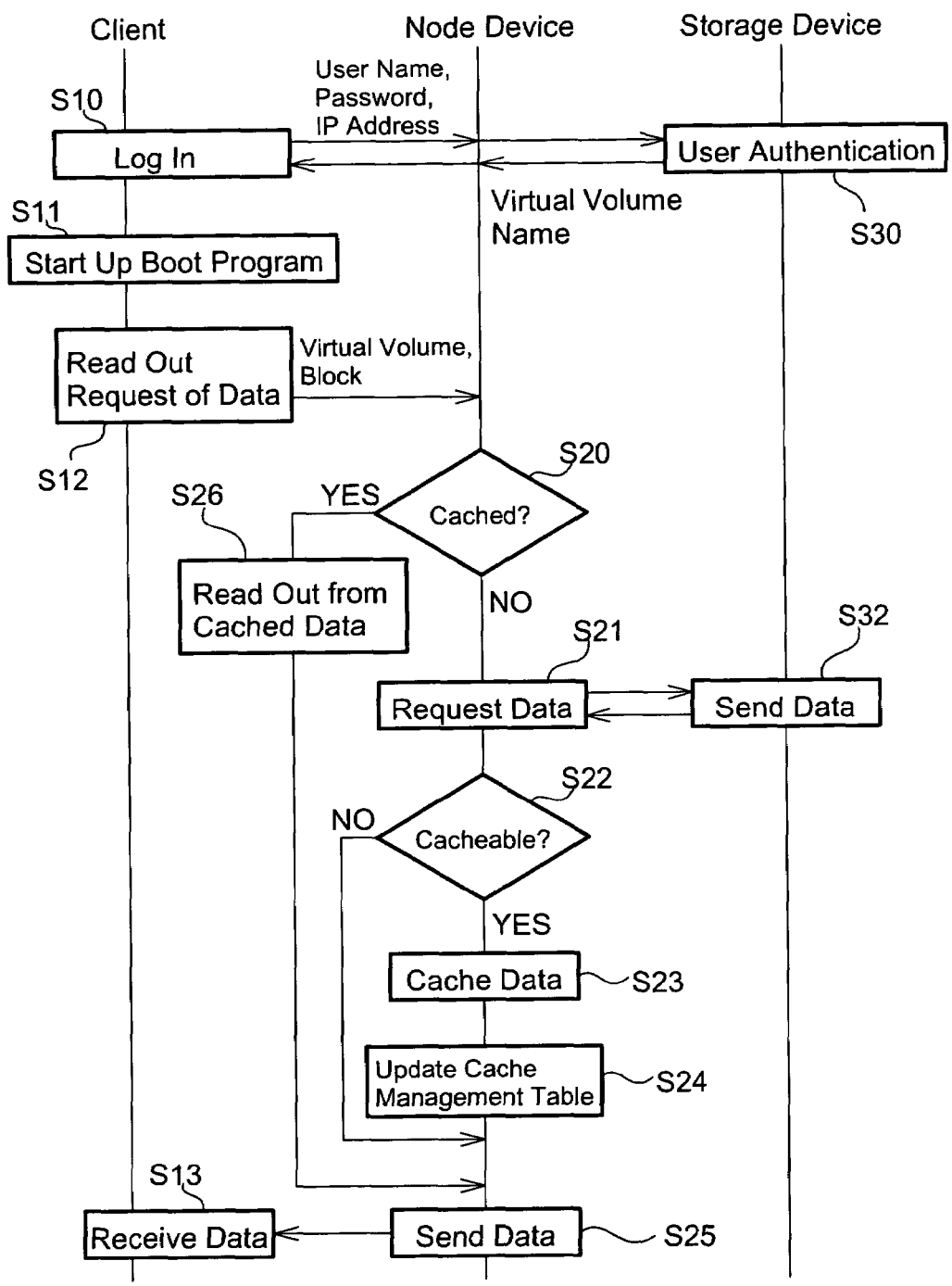
FIG. 7 is a flow chart illustrating process of reading of data.

FIG. 7 is a flow chart illustrating processing of reading the data, which shows process at the remote boot in the client 100 on the left side, the node device 200 on the center and the storage device 300 on the right side.

When the user turns on the computer, the ID input module 131 presents an input window for entering user information, such as the user ID and the password. Once the user logs in with the input of the user ID and the password, the client 100 transmits the user information to the node device 200 and the storage device 300, together with the IP address of the client 100 (Step S10). The storage device 300 refers to the user management table 334, based on this information, and then determines whether the user is authentic (Step S30). Upon confirmation of the user authentication, the storage device 300 stores the IP address of the client 100 in the user management table 334 and notifies the name of the virtual volume corresponding to the user. The notification is transmitted to the client 100 via the node device 200. The request, such as a read out request of the data from the client 100, is subsequently performed depending on the name of this virtual volume.

The client 100 starts up the boot program 130, which is stored in the ROM (Step S11). Upon completion of initialization process required for the boot, the boot program 130 transmits the read out request of the data on the operating system to the node device 200 (Step S12).

The node device 200 receives the read out request and then refers to the cache management table 232 to confirm whether or not the requested data has been cached (Step S20). If the requested data has been cached (Step S20), the corresponding data is read out from the cache block (Step S 26) and replays to the client 100 (Step S25). The client 100 receives the corresponding data to continue the start-up process (Step S13).

If the requested data has not been cached (Hereinafter referred to as "non-cached") (Step S20), the node device 200 requests the storage device 300 to read out the data (Step S21). The storage device 300 reads out the data from the physical volume with reference to the physical block management table 332, in response to this request, and then sends the data to the node device 200 (Step S32). The storage device 300 also refers to the cache attribute management table 333 and notifies the attribute information, as to whether or not the requested data is cacheable, to the node device 200 (Step S32). The requested data and the attribute information may integrally be notified with the attribute information included in the header or the like, or only the attribute information may be notified, being separated from the requested data.

Upon receipt of the data and the attribute information from the storage device 300, the node device 200 judges as to whether or not the data is cacheable, based on the attribute information (Step S22). When the data has been judged as cacheable, the node device 200 caches the received data (Step S23), updates the cache management table 232 depending on the storage location (Step S24) and sends the data to the client (Step S25). When the data has been judged as non-cacheable, the node device 200 skips the above cache processing and sends the data to the client (Step S25). The client thus receives the data, which is transmitted from the node device 200 (Step S13).

With repetitive process mentioned above, the client 100 may acquire the file required for the boot, and thus completes the remote boot. Although the above embodiment in FIG. 7 regards reading processing at the remote boot, normal process of reading the data regardless of the remote boot may be performed in the same manner, through the process from the read out request of the data (Step S12) to the receipt of the data (Step S13).

In the embodiment as exemplified above, the node device 200 inquires to the storage device 300, as to whether or not the data is cacheable. The node device 200, on the other hand, may integrally obtain the information on the cache attribute management table 333 in advance, from the storage device 300, and manage the data in the cache attribute management module 234. This application omits the query for the attribute information upon the request of the data.

A5. Process of Writing of Data

Figure 8:
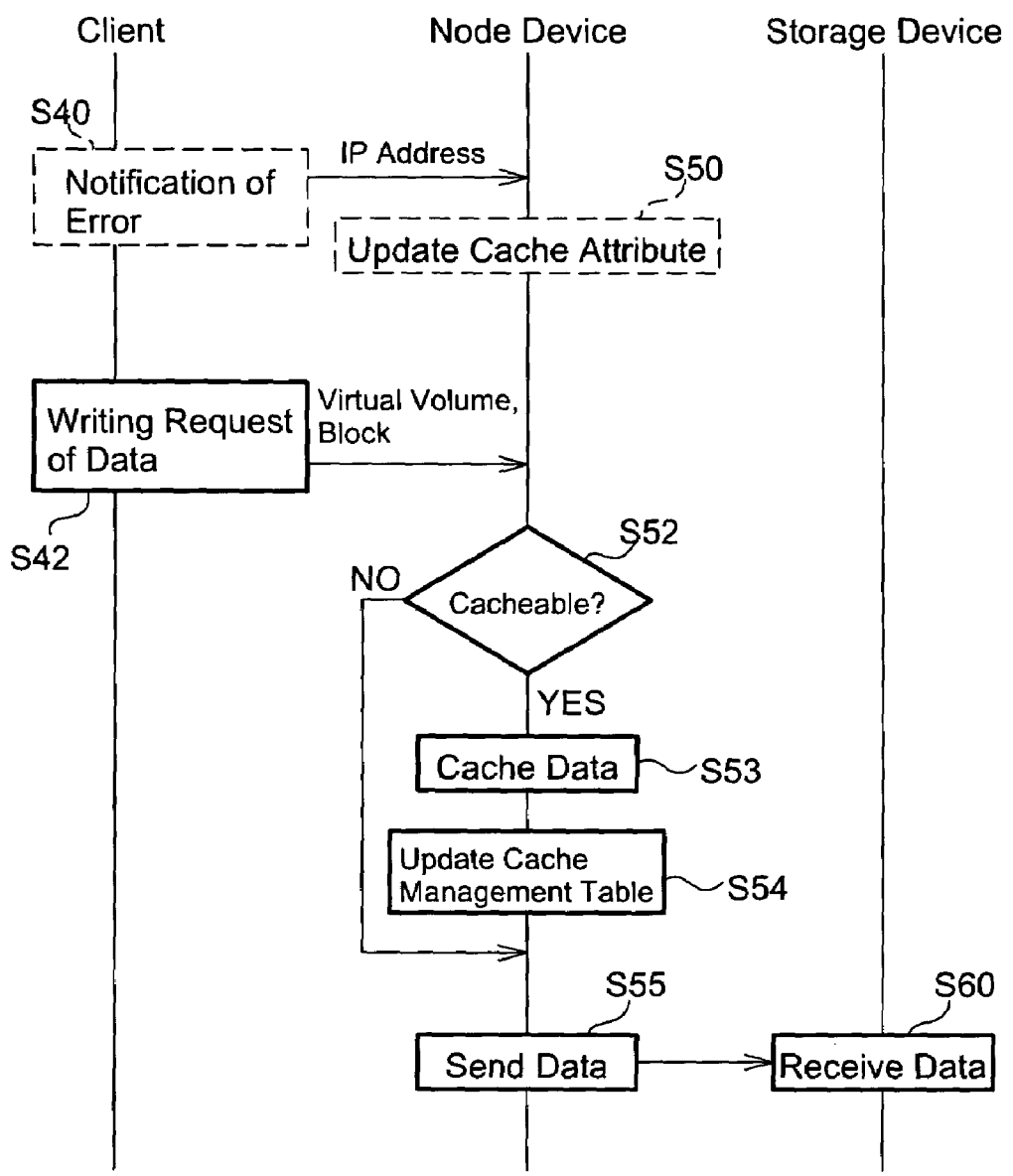
FIG. 8 is a flow chart illustrating process of writing of data.

FIG. 8 is a flow chart illustrating processing of writing of data, which shows process in the client 100 on the left side, the node device 200 on the center and the storage device 300 on the right side. An example in the figure shows that the writing of the core dump where the client 100 has been started up and is capable of transmission and receipt of the data to and from the node device 200 and the storage device 300, and a software error occurs on the operation in the client 100.

Upon detection of the software error (Step S40), the exception control program 141 in the client 100 notifies the node device 200 of the occurrence of the error together with the IP address (Step S40). The node device 200 updates the attribute information in the cache attribute management module 234, based on the information (Step S50). As shown in FIG. 6, the attribute regarding the writing from the corresponding client is switched to non-cacheable.

The exceptional control program 141 in the client 100 specifies the virtual block and sends the writing request of the core dump to the node device 200 (Step S42). Upon receipt of the writing request, the node device 200 refers to the cache attribute management module 234 to judge as to whether or not the data is cacheable (Step S52). When an operation error occurs in the client 100, the data is judged as non-cacheable by the node device 200, based on the attribute information, which has been updated in step S50. In some timing, such as before the occurrence of the error in the client 100, after recovering from the error and upon receipt of the writing request from other clients, the node device 200 may judge the data as cacheable, based on the attribute information regarding the specified virtual block.

When the data has been judged as cacheable (Step S52), the node device 200 caches the data, which is received from the client (Step S53), updates the cache management table 232 depending on the storage location (Step S54) and sends the data to the storage device 300 (Step S55). When the data has been judged as non-cacheable (Step S52), the node device 200 sends the received data to the storage device 300 without process of the cache (Step S55). The storage device 300 receives the data from the node device 200 (Step S60), and writes the data in the virtual block as specified.

With repetitive process mentioned above, the client 100 may complete the writing of the data in the virtual block on the storage device 300. This application prevents the core dump with an error from being cached in the node device 200.

The above embodiments exemplifies the case where the node device 200 updates the attribute information as to whether or not the data is cacheable upon receipt of an error notification of the client 100. In another available application, the attribute information regarding the cache operation may be included in each data, which is transmitted from the client 100 to the node device 200. For example, the exception control program 141 may set the attribute information to "non-cacheable" to all the data, which is written as a core dump, and thereby judges as to whether or not the data is cacheable, based on the attribute information.

A6. Modifications

The above embodiments show examples where the node device 200 performs no cache operation at the reading and the writing of the data from and in the storage device 300. The node device 200, however, may cache the data in the volatile memory 202 regardless of the data attribute, cacheable or non-cacheable, and then performs the judgment when transmitting the data from the memory 202 to the disk device 210. This application is attained with reference to the cache attribute management module 234 and the cache management table 232 when writing the data in the disk device 210. The reference of the cache management table 232 enables the specification of the virtual volume and the block number regarding the data, which is cached in the memory 202. Referring to the cache attribute management 234, based on this information enables the judgment as to whether or not the data is allowed to be cached in the disk device 210.

Another available application for attaining the control method in accordance with the modification includes "write in disk" information as shown with a dotted line in FIG. 5. The "write in disk" information indicates as to whether or not the data is allowed to be cached in the disk device 210, which is settable at the cache in the memory 202, with reference to the cache attribute management module 234. Recording the write in disk information in the cache management table 232 for each stored data requires no reference to the cache attribute management module 234 when transmitting the data to the disk device 210, and thereby easily judges the data attribute, cacheable or non-cacheable.

In accordance with the first embodiment as discussed above, the data attribute, as to whether or not the data is allowed to be cached in the disk device 210 in the node device 200, may be switched in reading and writing the data. This application avoids caching the data including secret information, such as a core dump, in the disk device 210, and thereby prevents leakage of the information in case of theft of the node device 200. When restricting the cache in the memory 202 in the node device 200, it is also possible to prevent the leakage of the information in case of unauthorized accesses to the node device 200.

B. Second Embodiment

Examples in the first embodiment show that the cache operation is performed based on the attribute information of the data, cacheable or non-cacheable. Examples in the second embodiment show that the node device encrypts the data to be cached in the disk device, and thus ensures the security. The data may be encrypted in view of the ensuring the security against unauthorized accesses to the node device when the data is cached in the memory 202. An exemplification in this embodiment shows that the data is encrypted when being transferred to the disk device 210 instead of the timing of the cache in the memory 202.

B1. Functional Blocks

Figure 9:
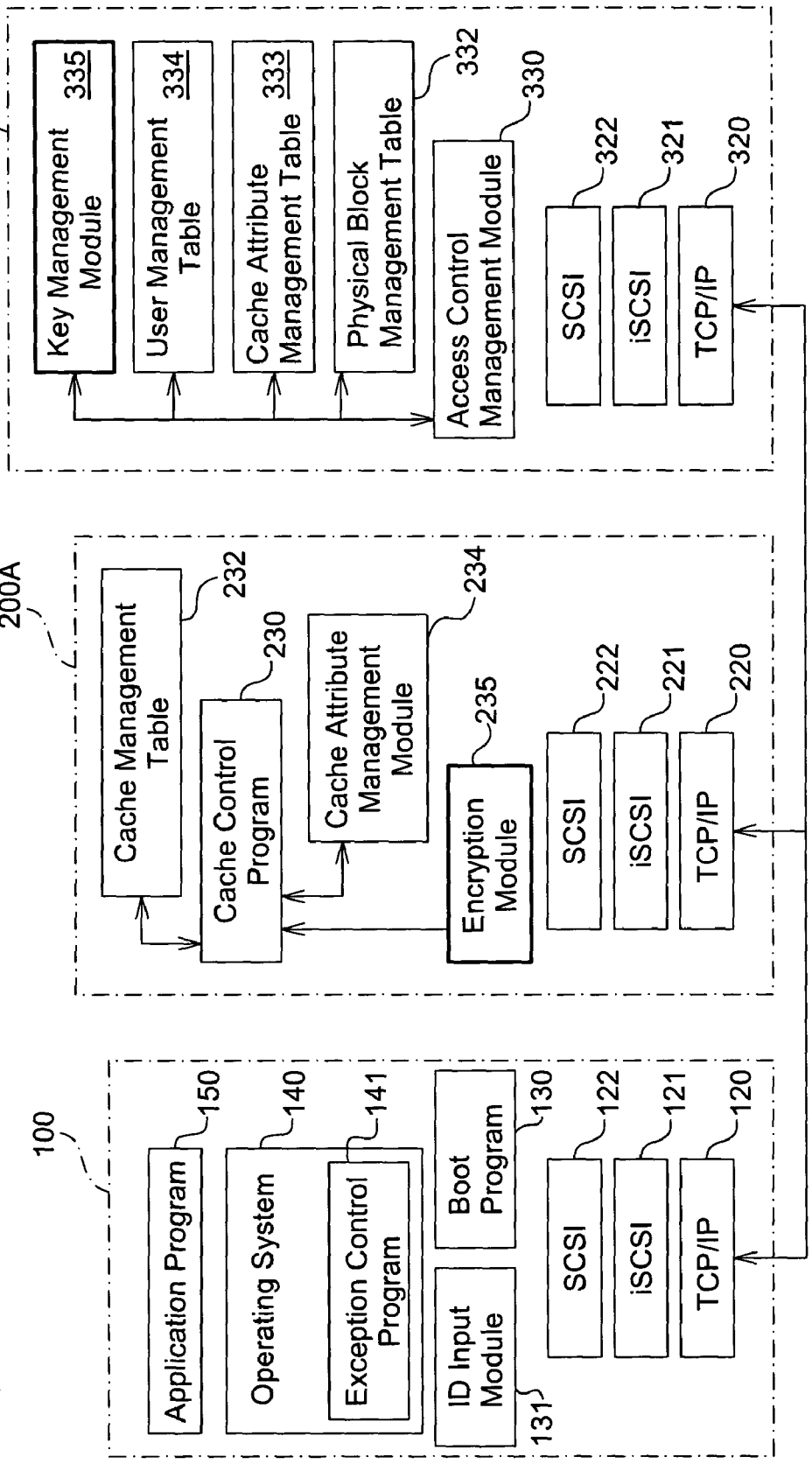
FIG. 9 shows functional blocks of a computer system in accordance with a second embodiment.

FIG. 9 shows functional blocks of a computer system in accordance with a second embodiment. The same functional blocks as those in the first embodiment are represented with the same signs. In the second embodiment, the attribute information, which is recorded in the cache attribute management module 234 and the cache attribute management table 333, does not indicate as to whether or not the data is cacheable but indicates as to whether or not the data is required to be encrypted. In accordance with the second embodiment, an encryption module 235 is added to a node device 200A, and a key management module 335 is added to a storage device 300A. The encryption module 235 in the node device 200A functions to encrypt the data during the cache of the data in the disk device 210 and to decode the data, which is read from the disk device 210. The key management module 335 functions to manage and provide the key information, which is used for the encryption, for the node device 200A.

B2. Process of Reading of Data

Figure 10:
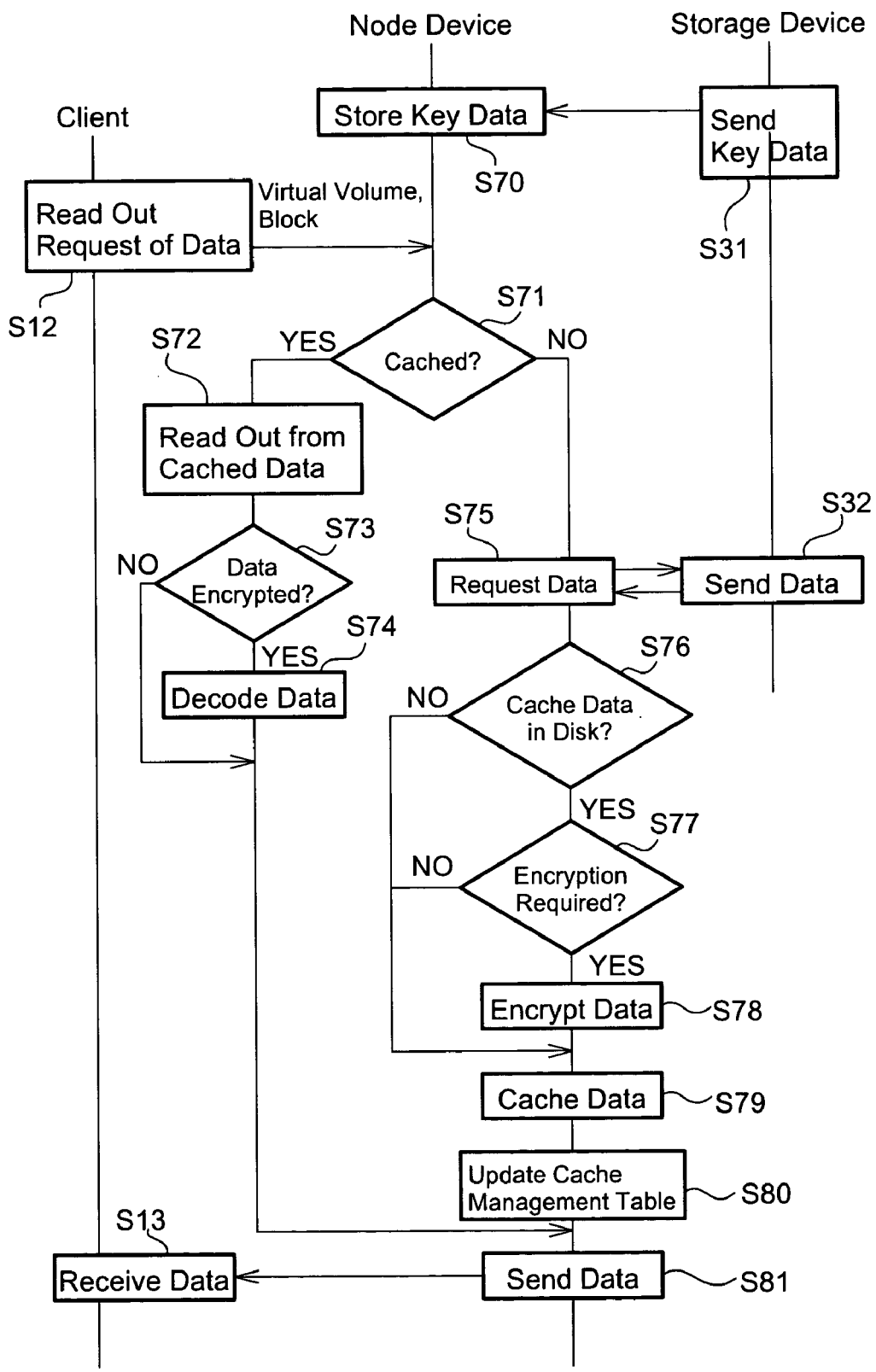
FIG. 10 is a flowchart illustrating process of reading of data in accordance with a second embodiment.

FIG. 10 is a flowchart illustrating the process of reading of the data in accordance with the second embodiment, which shows process in the client 100 on the left side, the node device 200A on the center and the storage device 300A on the right side. In accordance with the second embodiment, the storage device 300A transmits the key information to the node device 200A when the node device 200A is connected with a network and is started up (Step S31). The node device 200A stores the key information in the encryption module 235 (Step S70).

In this embodiment, the key information is set as specific information for each node device. The storage device 300A integrally manages the key information, which has been set to respective node devices that are connected with the network while providing new key information different from any of the issued information for a node device that is newly connected. Typical examples of the key information may consist of regular information, such as serial numbers, or may consist of irregular information, such as random numbers. Setting unique key information to respective node devices advantageously ensures the security of the data, which is cached in respective node devices, even when a counterfeit node device gains the key information.

Once the client 100 sends a read out request of the data to the node device 200A (Step S12), the node device 200A judges as to whether or not the requested data has been cached (Step S71). If the requested data has not been cached, the corresponding data is read out from the memory 202 or the disk device 210 (Step S 72), decoded if it has been encrypted (Steps S73 and S74) and sends the data to the client 100 (Steps S81 and S13).

If the requested data has not been cached (Step S71), the node device 200A requests the storage device 300A to send the data (Step S75). The storage device 300A sends the data to the node device 200A (Step S32). The storage device 300A also notifies the node device 200A of the attribute information that indicate as to whether or not the requested data is required to be encrypted (Step S32). This attribute information may be included in the header or the like of the requested data to be notified, or may separately be notified from the request data. Upon receipt of the data and the attribute information from the storage device 300A, the node device 200A judges as to where the data is to be cached (Step S76). If there is any cacheable area in the memory 202, the data is judged to be cached in the memory 202. If there is no cacheable area, it is judged that the data is required to be cached in the disk device 210. The judgment may be performed at the receipt of the data from the storage device 300A or processed based on a LRU (Least Recently Used). The LRU is employed as a method for migrating the infrequently accessed data among the data that is cached in the memory 202 to the disk device 210 preferentially When employing the LRU, the data received from the storage device 300A is automatically cached in the memory 202 and instead, one piece of the data, which has previously been stored in the memory 202, is migrated to the disk device 210.

When the data has been determined to be cached in the disk device 210 (Step S76), the node device 200A judges as to whether or not the encryption is required, based on the attribute information (Step S77). If the encryption is required, the node device 200A encrypts and caches the data (Steps S78 and S79). The node device 200A caches the data, which is not required to be encrypted or assumed to be cached in the memory 202 (Step S76), without process of the encryption. The node device 200A updates the cache management table 232, based on these storage locations for the cached data (Step S80) and sends the data to the client 100 (Step S25). The client thus receives the data, which is transmitted from the node device 200A (Step S13).

With repetitive process mentioned above, the client 100 may read out the required file from the storage device 300A. This application enables the data including the secret information to be encrypted with setting of the attribute information during the cache in the disk device 210, and thereby ensures the security. Along with the first embodiment, the node device 200A may integrally acquire the attribute information in advance, as to whether or not the data is required to be encrypted, from the storage device 300A, in order to be managed in the second embodiment.

B3. Process of Writing of Data

Figure 11:
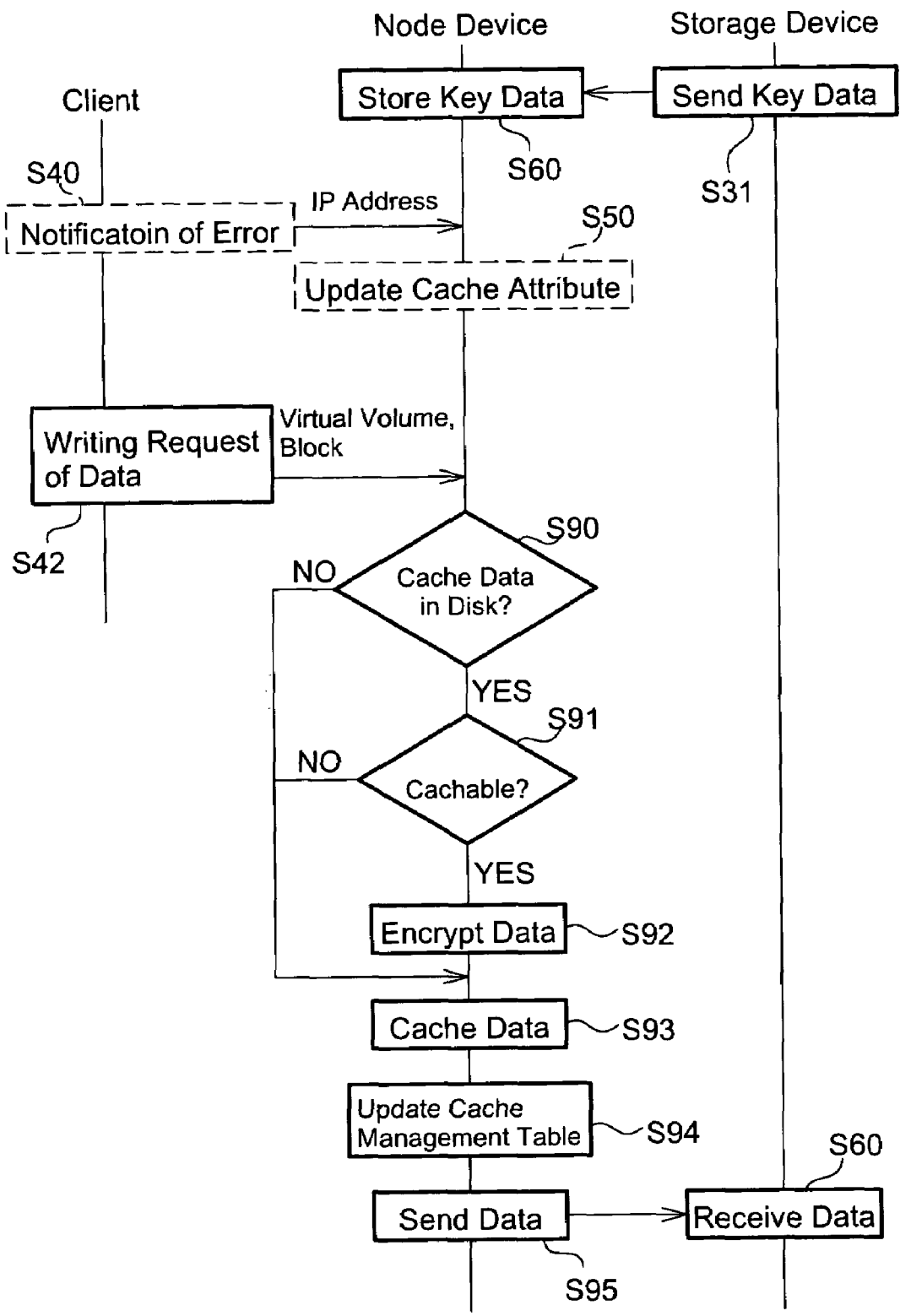
FIG. 11 is a flowchart illustrating process of writing of data in accordance with a second embodiment.

FIG. 11 is a flowchart illustrating the process of writing of the data in accordance with the second embodiment, which shows process in the client 100 on the left side, the node device 200A on the center and the storage device 300A on the right side with an exemplification of writing of a core dump.

As with the reading process, the node device 200A receives the key information from the storage device 300A at the start-up, and stores therein (Steps S60 and S31). Upon detection of the software error (Step S40), the exception control program 141 in the client 100 notifies the node device 200A of the occurrence of the error as well as the IP address (Step S40), in the similar manner to the first embodiment. The node device 200 updates the attribute information in attribute management module 234 to the status in which the data is required to be encrypted, based on the information (Step S50).

Upon the receipt of the writing request of the core dump from the client 100 under such status (Step S42), the node device 200A determines the location where the received data is to be cached, as with the reading process. The node device 200A encrypts the data, based on the attribute information as to whether the data is required to be encrypted, and then caches the data, which has been judged to need caching in the disk device 210 (Step S77). The node device 200A caches the data, which is not required to be encrypted or assumed to be cached in the memory 202 (Step S90), without process of the encryption (Step S94). The node device 200A updates the cache management table 232 (Step S94) depending on respective storage locations of the cached data and transmits the data to the storage device 300A (Step S95). The storage device 300A receives the data from the node device 200A (Step S60), and writes the data in the virtual block as specified. With repetitive process mentioned above, the client 100 may write the data in the virtual block on the storage device 300A.

In accordance with the second embodiment, applying the encryption to the writing of the data in the disk device prevents the leakage of the data in case of theft of the device. As the data is not encrypted when being written in the memory 202, caching the data with high use in the memory 202 ensures the reading and writing speed.

The key information is issued by the storage device 300A in the second embodiment. It is, however, not restricted but may be generated in the node device 200A. In accordance with the second embodiment, the encryption is controlled based on the attribute information, encrypted or not encrypted, and may also be performed whenever the data is cached in the disk device 210.

C. Third Embodiment

Applicable examples in the third embodiment show the transmission and the receipt of cacheable data between the client and the storage device via the node device and that of non-cacheable data between the client and the storage device directly.

C1. Functional Blocks

Figure 12:
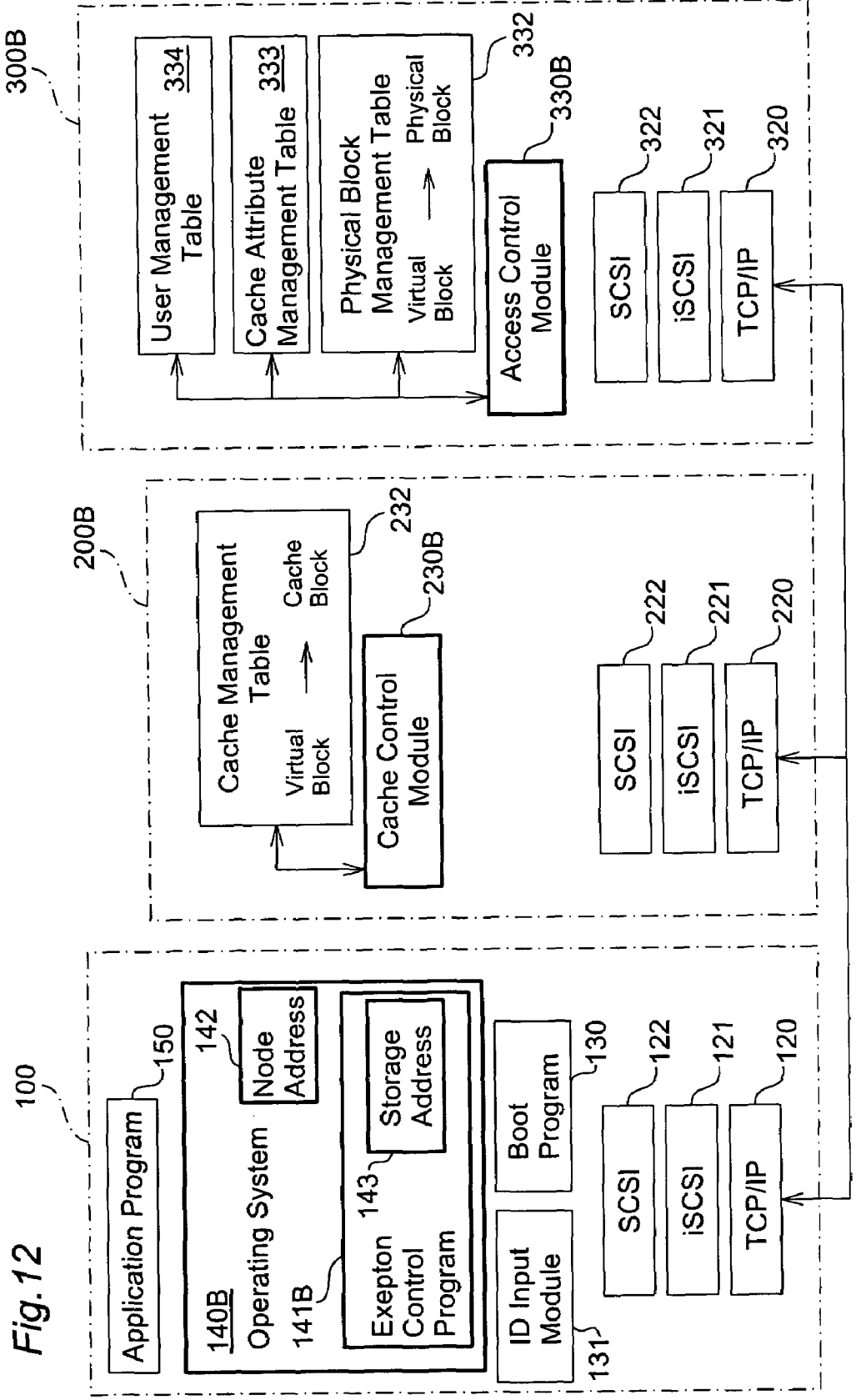
FIG. 12 shows functional blocks of a computer system in accordance with a third embodiment.

FIG. 12 shows functional blocks of a computer system in accordance with a third embodiment. The same functional blocks as those in the first embodiment are represented with the same signs. An operating system 140B provided for the client 100 in the third embodiment is different from that in the first embodiment. The operation system 140B stores the address 142 of the node device 200B therein (Hereinafter referred to as "node address") as destination address of a SCSI command. The operation system 140B includes an exception control program 141B that writes a core dump in an operation error. The exception control program 141B stores the address 143 of the storage device 300B therein (Hereinafter referred to as "storage address") as destination address in which the core dump is written. These functional blocks enable the client to switch the destination in which the data is written between error mode and normal mode.

The access control program 330B on the storage device 300B switches the destination to which the data is transmitted, based on the attribute of the cache. Thus, the data judged as cacheable is transmitted to the node device and non-cacheable data is directly transmitted to the client 100. In accordance with the third embodiment, the cache control module 230B may cache the data, received from the client 100 or the storage device 300B, without process of judgment as non-cacheable data is transmitted and received between the client 100 and the storage device 300B directly.

C2. Process of Reading of Data

Figure 13:
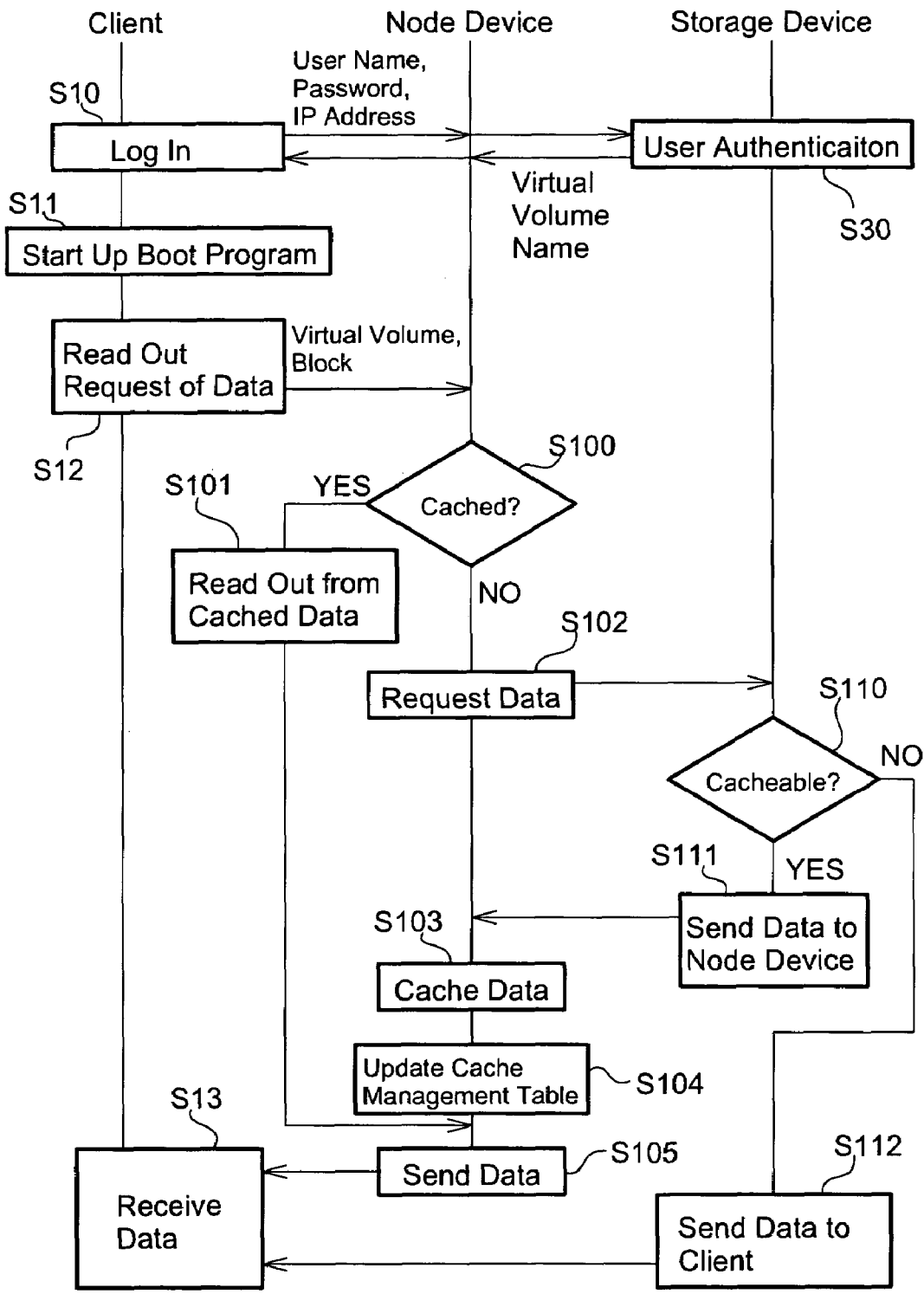
FIG. 13 is a flow chart illustrating process of reading of data in accordance with a third embodiment.

FIG. 13 is a flow chart illustrating processing of reading the data, which shows process at the remote boot in the client 100 on the left side, in the node device 200B on the center and in the storage device 300B on the right side, in accordance with the third embodiment.

Once the user turns the computer on, the log-in and the start-up of the boot program are performed in the same manner as the first embodiment (Steps S10, S30 and S11). The client 100 specifies the virtual volume and transmits the read out request of the data to the node device 200B (Step S12).

If the requested data has been cached (Step S100), the node device 200B reads out the corresponding data from the cache block (Step S 101) and sends the data to the client 100 (Step S105). Upon the receipt of this data, the client 100 continues the start-up process (Step S13).

If the requested data has not been cached (Step S100), the node device 200B requests the storage device 300B to read out the data (Step S102). If the requested data is set to be cacheable on the cache attribute management table 333 (Step S110), the storage device 300B sends the data to the node device 200B (Step S111). The node device 200B caches the data (Step S103), updates the cache management table 232 (Step S24) and sends the data to the client (Step S105).

If the requested data is non-cacheable (Step S110), the storage device 300B directly sends the data to the client (Step S112). The client thus receives the data, which is transmitted from the node device 200B (Step S13). The storage device 300B may notify the node device 200B that the data has been sent to the client. This notification releases the node device 200B from waiting mode for a response when the node device 200B waits for a response to the request of the data (Step S102).

In the above embodiment, a diversity of methods are available for specifying the address of the client where the data is transmitted from the storage device 300B directly. In one available example, the storage device 300B employs IP address, which was recorded in the user management table 334 at the first log-in. In another available example, the node device 200B notifies the storage device 300B of the address information of the client 100 as well as the request of the data.

C3. Process of Writing of Data

Figure 14:
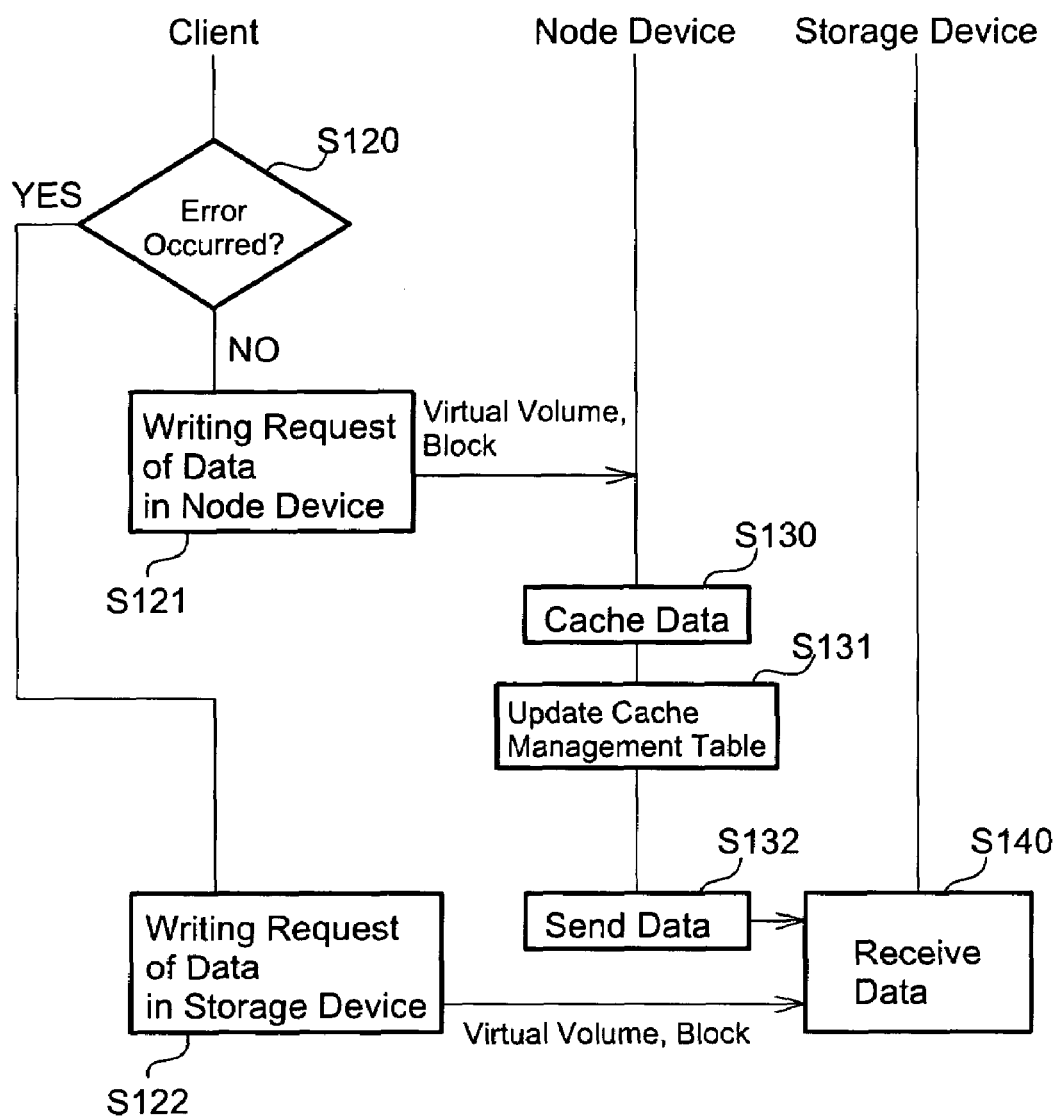
FIG. 14 is a flow chart illustrating process of writing of data.

FIG. 14 is a flow chart illustrating processing of writing the data, which shows process at the writing of the core dump in the client 100 on the left side, the node device 200B on the center and the storage device 300B on the right side. If no error occurs in the client 100 (Step S120), the client 100 transmits the writing request of the data to the node device 200 (Step S121). Upon receipt of the request, the node device 200B caches the data (Step S13) and updates the cache management table 232 (Step S131). The node device 200B then transmits the data to the storage device 300B at the preset timing, such as the timing when the writing data, which has been cached, reaches the scheduled amount (Step S132). The storage device 300B receives and writes this data in the virtual block as specified (Step S140).

Upon detection of the occurrence of the software error (Step S120), the exception control program 141 directly sends the writing request of the data to the storage device 300B by switching the destination address of the data, from the node device 200B to the storage device 300B (Step S122). The storage device 300B receives and writes the data in the virtual block as specified (Step S140).

Applications of the third embodiment enable the data to be transmitted and received without going through the node device 200B, based on the data attribute, cacheable or non-cacheable, and thereby ensures the security of the data in case of theft of the node device or unauthorized accesses thereto.

The above embodiment and its modifications are to be considered in all aspects as illustrative and not restrictive. There may be many modifications, changes, and alterations without departing from the scope or spirit of the main characteristics of the present invention.

In accordance with the present invention, a variety of methods, such as restriction of the cache in the node device, encryption process when caching the data and transmission and receipt of the data without going through the node device, are provided in order to prevent the data including secret information from being cached in the disk device on the node device as it is. Employing such technique accordingly ensures the security of the data in case of theft of the node device or unauthorized accesses thereto.

What we claim:

1. A cache control method in a computer system that includes a storage device having a plurality of physical devices for storing data, at least one client, and a relay device, the cache control method comprising:

relaying, by said relay device, data between said storage device and each of said at least one client, wherein said relay device includes a cache disk module for caching processed data being relayed between said storage device and said at least one client;

relating data processed in the computer system with attribute data which configures a caching operation of the cache disk module that caches the processed data on a primary network which connects each of said at least one client and said relay device to each other; and mediating the processed data between the storage device and each of the at least one client via a secondary network, which connects said relay device and said storage device to each other, without the caching operation of the cache disk module when the attribute data prohibits the caching operation, wherein a plurality of virtual volumes are formed on said physical devices, and each of said at least one client is assigned to at least one of said virtual volumes, thereby permitting said each of said at least one client to access data stored in said at least one of said virtual volumes to which it is assigned, wherein said attribute data is stored in a cache attribute management table which stores a plurality of entries, each of which sets a corresponding relation between identification information identifying one of said virtual volumes, identification information identifying at least two of said physical devices forming a part of said one of said virtual volumes, and said attribute data, which provides an indication whether data stored in said one of said physical devices is cacheable or not, wherein said attribute data corresponding to each of said at least two of said physical devices may differ from one another, wherein each entry of said cache attribute management table further sets a corresponding relation between an indication as to whether data to be read from each of said at least two of said physical devices forming part of said one of said virtual volumes is cacheable or not and an indication as to whether data to be written to each of said at least two of said physical device forming part of said one of said virtual volumes is cacheable or not, and wherein when one physical device of said at least two of said physical devices is shared by a first virtual volume and a second virtual volume, said attribute data corresponding to said first virtual volume indicates that data stored in said one physical device is cacheable, and said attribute data corresponding to said second virtual volume indicates that data stored in said one physical device is not cacheable.

2. The cache control method according to claim 1, further comprising encrypting the processed data cached in the cache disk module.

3. The cache control method according to claim 1, wherein said primary network and said secondary network are different from each other.

4. A relay device comprising:

a cache disk module for caching data being relayed between a storage device having a plurality of physical devices for storing data, and at least one client, wherein said relay device relays data between said storage device and each of said at least one client;

an obtaining unit that obtains attribute data related with data processed by the at least one client, wherein the attribute data configures a caching operation of the cache disk module that caches the processed data on a primary network which connects each of said at least one client and said relay device to each other; and a mediating unit that mediates the processed data between the storage device and each of the at least one client via a secondary network, which connects said relay device and said storage device to each other, without the caching operation of the cache disk module when the attribute data prohibits the caching operation, wherein a plurality of virtual volumes are formed on said physical devices, and each of said at least one client is assigned at least one of said virtual volumes, thereby permitting said each of said at least one client to access data stored in said at least one of said virtual volumes to which it is assigned, wherein said attribute data is stored in a cache attribute management table which stores a plurality of entries, each of which sets a corresponding relation between identification information identifying one of said virtual volumes, identification information identifying at least two of said physical devices forming a part of said one of said virtual volumes, and said attribute data, which provides an indication whether data stored in said one of said physical devices is cacheable or not, wherein said attribute data corresponding to each of said at least two of said physical devices may differ from one another, wherein each entry of said cache attribute management table further sets a corresponding relation between an indication as to whether data to be read from each of said at least two of said physical devices forming part of said one of said virtual volumes is cacheable or not and an indication as to whether data to be written to each of said at least two of said physical device forming part of said one of said virtual volumes is cacheable or not, and wherein when one physical device of said at least two of said physical devices is shared by a first virtual volume and a second virtual volume, said attribute data corresponding to said first virtual volume indicates that data stored in said one physical device is cacheable, and said attribute data corresponding to said second virtual volume indicates that data stored in said one physical device is not cacheable.

5. The relay device according to claim 4, further comprising:

a volatile memory for the caching, wherein the mediation unit mediates the processed data between the storage device and the at least one client via the secondary network, by primarily using the volatile memory and secondarily using the cache disk module.

6. The relay device according to claim 5, further comprising:

an encryption unit that encrypts the data cached in the cache disk module of the relay device.

7. The relay device according to claim 6, further comprising:

an encryption obtaining unit that obtains encryption attribute data related with the processed data, wherein the encryption attribute data configures an encrypting operation that encrypts the data cached in the cache disk module; and an encryption unit that encrypts the data cached in the cache disk module when the encryption attribute data requires the encrypting operation.

8. The relay device according to claim 6, further comprising:

a volatile memory for storing key data used for generating the encrypted data.

9. The relay device according to claim 4, wherein the attribute data is included in the processed data, and the obtaining unit obtains the attribute data from the processed data.

10. The relay device according to claim 4, wherein the attribute data is associated with a data storage block of the storage device for storing the processed data, and the obtaining unit obtains the associated attribute data from the storage device via the network in advance of mediation by the mediation unit.

11. The relay device according to claim 4, wherein the attribute data is included in error data that notifies an occurrence of an error in the at least one client, and the obtaining unit obtains the attribute data from the error data, and wherein switching between caching and not caching of the processed data is conducted when error data is received.

12. A storage device that is connected to at least one client and a relay device, the storage device comprising:

a plurality of physical devices upon which are formed a plurality of virtual volumes for storing data processed by the at least one client, wherein said relay device relays data between said storage device and each of the at least one client, wherein said relay device includes a cache disk module for caching processed data being relayed between said storage device and said at least one client, wherein the processed data is mediated between the at least one client and the storage device via a secondary network, which connects said relay device and said storage device to each other, and wherein each of said at least one client is assigned to at least one of said virtual volumes, thereby permitting each of said at least one client to access data stored in said at least one of said virtual volumes to which it is assigned;

a relation unit that relates the processed data with attribute data which configures a caching operation of the cache disk module that caches the processed data on a primary network which connects each of said at least one client and said relay device to each other; and a notification unit that notifies the relay device of the attribute data related with the processed data, wherein said attribute data is stored in a cache attribute management table which stores a plurality of entries, each of which sets a corresponding relation between identification information identifying one of said virtual volumes, identification information identifying at least two of said physical devices forming a part of said one of said virtual volumes, and said attribute data, which provides an indication whether data stored in said one of said physical devices is cacheable or not, wherein said attribute data corresponding to each of said at least two of said physical devices may differ from one another, wherein each entry of said cache attribute management table further sets a corresponding relation between an indication as to whether data to be read from each of said at least two of said physical devices forming part of said one of said virtual volumes is cacheable or not and an indication as to whether data to be written to each of said at least two of said physical device forming part of said one of said virtual volumes is cacheable or not, and wherein when one physical device of said at least two of said physical devices is shared by a first virtual volume and a second virtual volume, said attribute data corresponding to said first virtual volume indicates that data stored in said one physical device is cacheable, and said attribute data corresponding to said second virtual volume indicates that data stored in said one physical device is not cacheable.

13. The storage device according to claim 12, wherein the relation unit comprises:

an additional module that adds the attribute data to the processed data, and the added attribute data is mediated together with the processed data.

14. The storage device according/to claim 12, wherein the attribute data is associated with a data storage block of the storage device, and the notification unit notifies the relay device of the associated attribute data in advance of mediation of the processed data.

15. The storage device according to claim 12, wherein the storage device further comprises:
   a key data management unit that manages key data used for encrypting the data cached in the cache disk module of said relay device; and
   a key notification module that notifies the relay device of the managed key data.

16. A computer readable recording medium in which a computer program is recorded, the computer program causing a computer to control operations of a relay device, the computer program when executed causes the relay device to perform the functions of:
   relaying data between a storage device and each of at least one client,
   wherein said relay device includes a cache disk module for caching data being relayed between the storage device having a plurality of physical devices for storing data, and the at least one client;
   obtaining attribute data related with data processed by the at least one client,
   wherein the attribute data configures, a caching operation of the cache disk module that caches the processed data on a primary network which connects each of said at least one client and said relay device to each other; and
   mediating the processed data between the storage device and each of the at least one client via a secondary network, which connects said relay device and said storage device to each other, without the caching operation of the cache disk module when the attribute data prohibits the caching operation,
   wherein a plurality of virtual volumes are formed on said physical devices, and each of said at least one client is assigned at least one of said virtual volumes, thereby permitting said each of said at least one client to access data stored in said at least one of said virtual volumes to which it is assigned,
   wherein said attribute data is stored in a cache attribute management table which stores a plurality of entries, each of which sets a corresponding relation between identification information identifying one of said virtual volumes, identification information identifying at least two of said physical devices forming a part of said one of said virtual volumes, and said attribute data, which provides an indication whether data stored in said one of said physical devices is cacheable or not,
   wherein said attribute data corresponding to each of said at least two of said physical devices may differ from one another,
   wherein each entry of said cache attribute management table further sets a corresponding relation between an indication as to whether data to be read from each of said at least two of said physical devices forming part of said one of said virtual volumes is cacheable or not and an indication as to whether data to be written to each of said at least two of said physical device forming part of said one of said virtual volumes is cacheable or not, and
   wherein when one physical device of said at least two of said physical devices is shared by a first virtual volume and a second virtual volume, said attribute data corresponding to said first virtual volume indicates that data stored in said one physical device is cacheable, and said attribute data corresponding to said second virtual volume indicates that data stored in said one physical device is not cacheable.

* * * * *